J. B. KNUDSEN.
EMERGENCY BRAKE.
APPLICATION FILED SEPT. 13, 1913.
1,145,595.
Patented July 6, 1915.
2 SHEETS—SHEET 1.
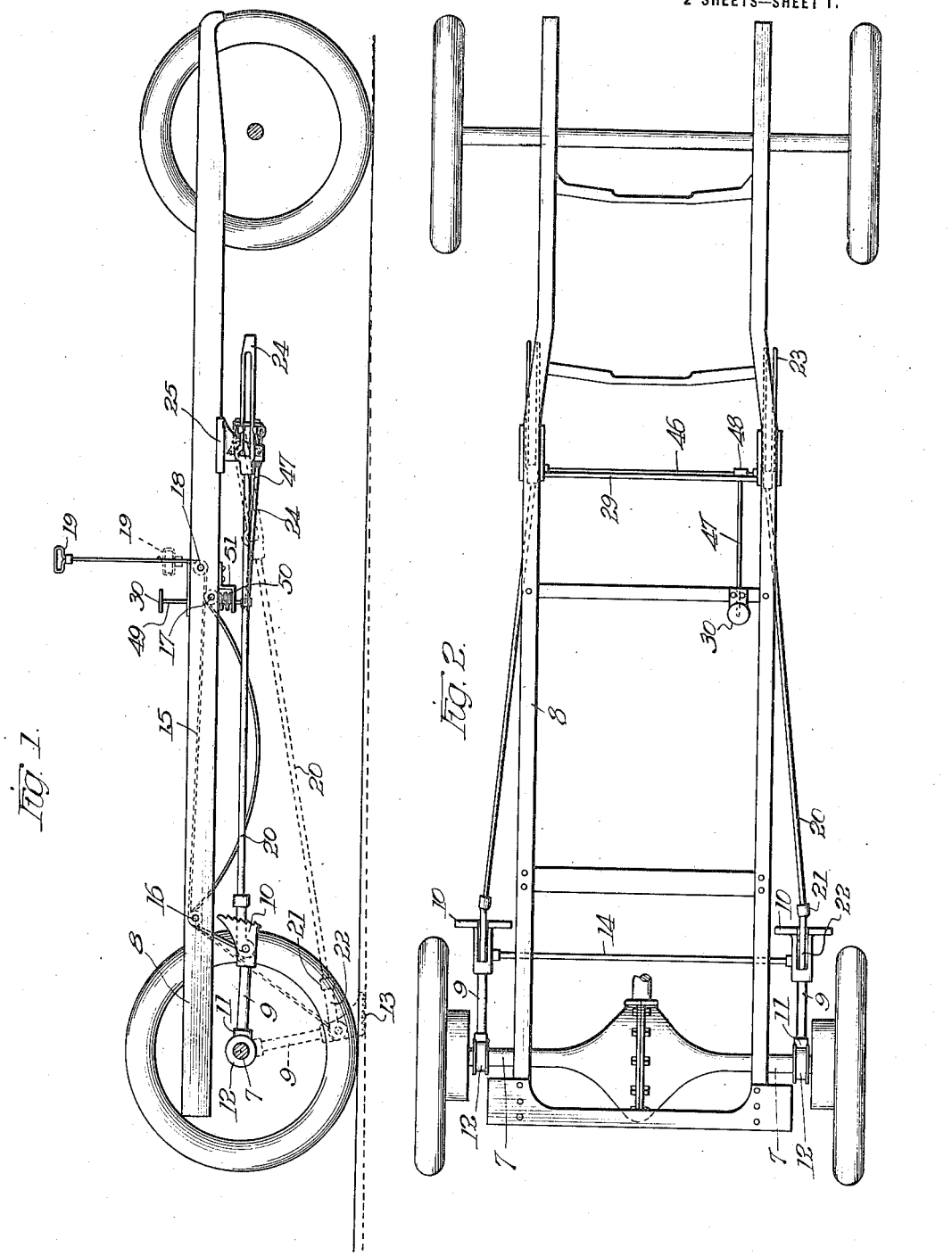

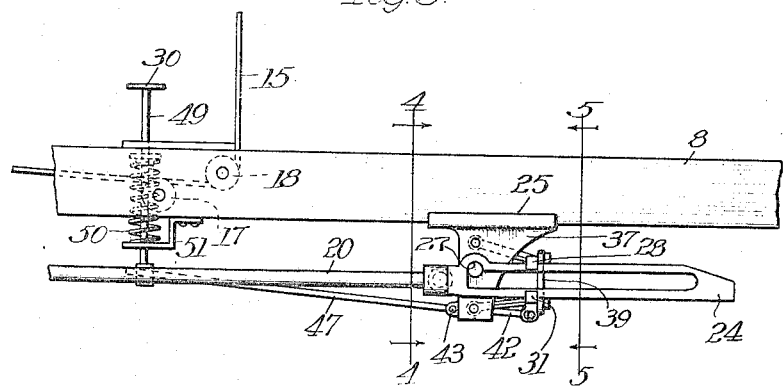
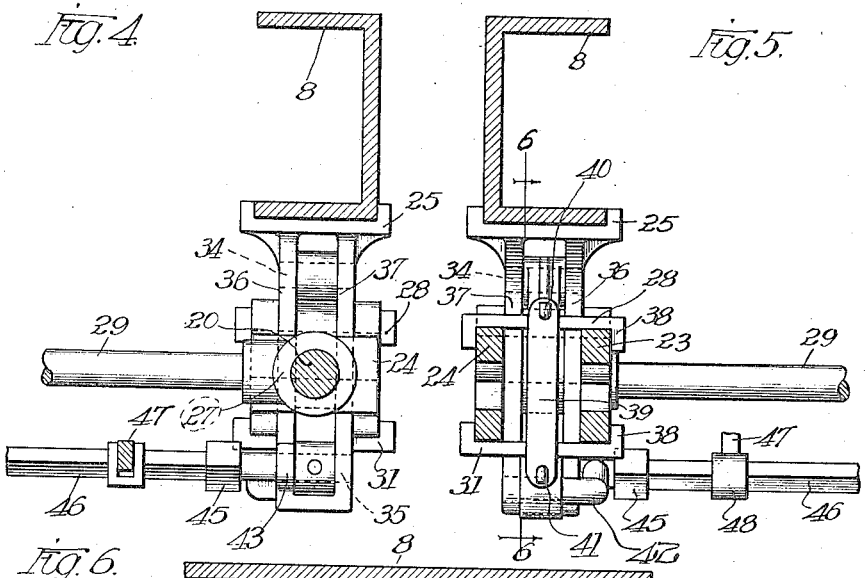
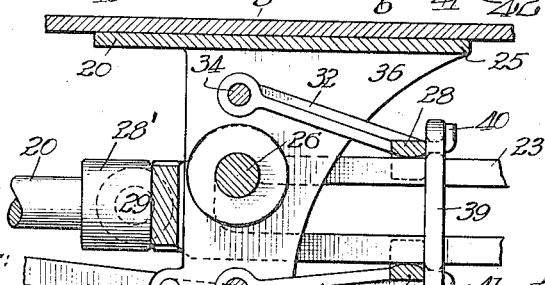

UNITED STATES PATENT OFFICE.

JACOB B. KNUDSEN, OF CHICAGO, ILLINOIS.

EMERGENCY-BRAKE.

1,145,595.  Specification of Letters Patent.  Patented July 6, 1915.

Application filed September 13, 1913. Serial No. 789,633.

*To all whom it may concern:*

Be it known that I, JACOB B. KNUDSEN, a citizen of the United States, residing at Chicago, in the county of Cook and State of Illinois, have invented new and useful Improvements in Emergency-Brakes, of which the following is a full, clear, concise, and exact description, reference being had to the accompanying drawing, forming a part of this specification.

My invention relates to emergency brakes for vehicles and particularly to such brakes for use on automobiles. In brakes of this sort as heretofore used, the braking action has been effected by braking the wheels against rotation. A great objection to such brakes is that, due to the fact that the braking action depends on the friction between the tires and the ground, accidents are not infrequent because the car will slide along on wet pavements or will "skid" sidewise, which no amount of locking of the wheels can prevent. Furthermore, such braking action, if the clutch is not thrown out, operates against the engine. Still another objection is that every operation of such brakes causes great wear and tear on the tires.

It is one of the principal objects of my invention to provide an emergency brake which will effectually stop the vehicle to which it is attached almost instantly; which will prevent all possibility of skidding, and which will operate just as effectively whether the clutch is out or not thereby reducing the danger of serious accident to a minimum.

It is a further object of my invention to provide an emergency brake that causes practically no wear on the tires, that is easy and simple to operate and that is readily installed on a vehicle either during the construction thereof or afterward.

In the following description and accompanying drawings I have illustrated one preferred embodiment of my invention, but I wish it understood that numerous changes may be made in the form, construction and arrangement of the parts without departing from the spirit of the invention or the scope of the appended claims.

In the drawings: Figure 1 is a side elevation of the frame of a vehicle having connected thereto an emergency brake constructed in accordance with my invention; Fig. 2 is a top plan of the same; Fig. 3 is a detail showing the brake operating means in side elevation; Fig. 4 is a cross sectional view taken on the line 4—4 of Fig. 3 looking in the direction of the arrows; Fig. 5 is a similar view taken on the line 5—5 of Fig. 3 looking in the direction of the arrows; and Fig. 6 is a view taken on the line 6—6 of Fig. 5 showing parts in side elevation and parts in cross section.

Referring now to the drawings, the driving axle 7 of the vehicle 8 is provided with a pair of supporting legs 9 having at the ends thereof shoes 10, and inserted at the top in sockets 11 on sleeves 12 which are rotatably mounted on the axle 7 just within the usual brake drums. The sleeves 12 are composed of two parts bolted together to facilitate installation. The supporting legs 9 are somewhat longer than the vertical perpendicular from the axle and they are adapted, therefore, when the brake is operated, to support the vehicle with the driving wheels off the ground. In order that the shoes 10 will make firm engagement with the ground the lower faces thereof are serrated as at 13. To provide a strengthening element and to cause the two legs 9 to operate in unison a connecting rod 14 is journaled in each of the shoes 10.

To raise the legs 9 to a normal inoperative position, a chain 15 is attached to the connecting rod 14 and passes over pulleys 16 and 17 and under a pulley 18, all mounted on the frame of the vehicle 8, to a position near the driver's seat. On the end of this chain 15 is a handle 19 for convenience of operation. It will be seen that when the legs are down, in the position shown by the dotted lines of Fig. 1, following a operation of the brake, they are readily raised to inoperative position (full lines of Fig. 1) by pulling on the handle 19, the pulleys 16, 17 and 18 serving to keep the slack of the chain in the proper place.

The legs 9, being placed in normal inoperative position, are retained in such position by a locking mechanism comprising the following apparatus. As the locking mechanism is in duplicate the description of one set will suffice. Connected with the shoe 10 by a link 20 which is attached at 21 to an arm 22 mounted on the connecting rod 14, are a pair of long, narrow, slotted bars 23 and 24 which straddle a bracket 25 and are adapted to make sliding engagement with a pin 26 passing through the bracket 25 and extending outwardly on either side thereof. In the rear ends of the slotted bars 23 and 24 are notches 27 adapted to fit over the pin 26 when the bars 23 and 24 are pushed forward by the raising of the legs 9, a dog 28 bearing on the bars 23 and 24 serving to hold the parts in place as above described, the dog being held in position by means hereinafter disclosed. As the slotted bars are connected, as before mentioned, with the legs 9, the latter will be held raised from the ground, in inoperative position, until the engagement of the notch 27 with the pin 26 is released, whereupon the bars being free to slide along the pin 26, the legs 9 will swing downward under the force of gravity. To strengthen the apparatus and to cause the slotted bars on either side of the vehicle to operate in unison, the single ends 28' of the two sets of slotted bars are connected by a cross rod 29. It will be noted that the links 20 and notched bar 24 constitute, in effect, latching devices directly and pivotally connected with the legs 9.

To release the locking mechanism, the depression of a pedal 30 near the driver's seat, through suitable connections, now to be described, causes the pressure of the dog 28 to be removed from the slotted bars 23 and 24 and at the same time forces the said bars upward by means of another similar dog 31 so that the notches 27 are moved out of engagement with the pin 26. The dogs 28 and 31 are carried transversely on arms 32 and 33 pivotally mounted on bolts 34 and 35 between the two side plates 36 and 37 of the bracket 25, one arm, of course, being above the slotted bars 23 and 24 and the other below, so that the bars are embraced by the two dogs 28 and 31 which are flanged at their ends as shown at 38. The dogs 28 and 31 are caused to move in unison by a link 39 which connects the dog-carrying arms 32 and 33, the link 39 being apertured at each end to engage the hooked ends 40 and 41 of the arms. The arms 32 and 33, and thereby the dogs 28 and 31, are moved by means of a bifurcated pin 42, the two branches being journaled in a lug 43 formed on the side plate 36 of the bracket 25 and a lug 44 formed on the arm 33. This pin 42 is mounted, by means of a square coupling formed thereon, to a square cross rod 46 (on which is similarly mounted the corresponding pin on the opposite side) and is swung to move the arms by the turning of the cross rod 46, caused by the motion of a link 47, having a square coupling 48 to fit over the rod 46, and connected at its other end to a plunger 49 on which is mounted the pedal 30. The latter is held in normal position by a coiled spring 50 which bears at one end on the plunger 49 and at the other end on a bracket 51 secured to the frame of the vehicle 8. The pedal therefore, is depressed against the force of the spring 50 and the strength of the latter is arranged so as to allow just enough movement of the plunger 49 to cause the slight displacement of the dogs 28 and 31 necessary to release the slotted bars 23 and 24. It will be clear that this spring 50 normally holds the parts in such position that the dog 28 bears down upon the slotted bars 23 and 24 except when the pedal 30 is depressed.

The operation is as follows: The brake being off, the leg 9 is held up in inoperative position by the link 20 and the slotted bars 23 and 24 which are held by the dog 28 with the notches 27 engaging the pin 26. When it is desired to operate the brake the pedal 30 is depressed, the plunger 49 will cause the link 47 to swing downwardly slightly, thus turning the square rod 46 and thereby swinging the pin 42. This latter being connected to the arm 33, its motion causes the arm to swing upward, the arm 32 being similarly displaced because of the connecting link 39. Consequently the pressure of the dog 28 carried by the arm 32 is removed from the slotted bars and the dog 31 carried by the arm 33 forces the bars upward until the notch 27 is moved out of engagement with the pin 26. As nothing now holds up the legs 9 they will swing downward until the shoes 10 rest on the ground. The legs and shoes will now have the position shown by the dotted lines of Fig. 1 with the leg not quite vertical. The momentum of the vehicle carries it forward until the legs are in a vertical position. Inasmuch as the legs are somewhat longer than the vertical perpendicular from the axle, as before mentioned, it will be obvious that the vehicle will be raised so that the driving wheels are off the ground. In other words, the legs 9 form a support on which the vehicle is jacked up by the force of its own momentum and as long as any momentum exists the vehicle will retain this position. It will be apparent that, as the driving wheels are raised off the ground with the vehicle supported on the legs the car cannot move in any way. Thus the possibility of the vehicle sliding forward or skidding on wet roads or pavements is removed. Furthermore, as there is no traction, the brake does not operate against the engine or motor in case the power is not cut off. In addition there is no wear on the tires. Consequently, by my invention, I have not only reduced materially the tire up-keep cost, but, what is more important in these days of congested traffic, I have reduced the possibility of accident to a minimum.

As soon as all momentum of the vehicle is lost, the weight thereof is sufficient to cause it to drop back to normal position whereupon the legs may readily be raised by means of the chain as before described. As the legs swing upward the link 20 pushes the slotted bars 23 and 24 forward until the notches 27 slip into engagement with the pin 26 and the dog 28 holding the parts in place under the action of the spring 50, the legs are thus secured in inoperative position automatically.

Having thus described my invention, what I claim as new and desire to secure by Letters Patent is—

1. The combination with a vehicle, of braking means therefor comprising legs connected with said vehicle and adapted to support the same with the driving wheels thereof off the ground, a movable latch member directly and pivotally connected with said legs and adapted to engage a fixed member, means for normally holding said members in engagement thereby holding said legs in inoperative position, and means for releasing said movable latch member from engagement with said fixed member thereby to permit said legs to take operative position through the force of gravity.

2. The combination with a vehicle, of braking means therefor comprising legs connected with said vehicle and adapted to support the same with the driving wheels thereof off the ground, a movable latch member directly and pivotally connected with said legs and adapted to engage a fixed member, means for normally holding said members in engagement thereby holding said legs in inoperative position, and means for releasing said movable latch member from engagement with said fixed member thereby to permit said legs to take operative position through the force of gravity, said means being adapted to be operated by the driver.

3. The combination with a vehicle, of braking means therefor comprising legs connected with said vehicle and adapted to support the same with the driving wheels thereof off the ground, means for placing said legs in normal inoperative position, a movable latch member directly and pivotally connected with said legs and adapted to engage a fixed member, means for automatically locking said members in such engagement thereby to hold said legs in inoperative position, and means for releasing said locking means.

4. The combination with a vehicle, of braking means therefor, comprising a brake shoe carried by said vehicle and movable into and out of contact with the ground, a link pivotally connected with said shoe and slidably connected with said vehicle, means for limiting said sliding movement interengaging means on said link and vehicle for holding the brake-shoe in raised position, and means for moving said link to cause said interengaging means to disengage to permit the brake-shoe to drop.

5. The combination with a vehicle, of braking means therefor, comprising a brake shoe carried by said vehicle and movable into and out of contact with the ground, a link pivotally connected with said shoe, and means for connecting said link to said vehicle comprising a member having a slot therein, and a recess offset from said slot, and a pin for engagement with said slot and recess to limit the movement of the link and latch it in position.

6. The combination with a vehicle, of a member movably mounted thereon adapted to hold the same with the driving wheels thereof off the ground, and means for limiting the movement of said movable member and for holding the latter in inoperative position, said means comprising a member having a slot and a recess offset from said slot, and a pin for engagement with said slot to limit the movement of said movable member and with said recess to hold the movable member in inoperative position.

7. In an emergency brake, a plurality of members adapted to support the vehicle with the driving wheels thereof off the ground, a plurality of slotted members, pins with which said slotted members have latching connections, rods connecting said slotted members with said supporting member, a pivoted member for holding said slotted members in engagement with said pins, a pivoted member for forcing said latched members out of latching engagement, and means for operating both of said pivoted members.

8. The combination with a vehicle, of a member movably mounted thereon adapted to hold the same with the driving wheels thereof off the ground, and means for limiting the movement of said movable member and for holding the latter in inoperative position, said means comprising a member having a slot and a recess offset from said slot, and a pin for engagement with said slot to limit the movement of said movable member and with said recess to hold the movable member in inoperative position, and means for releasing said holding means.

In witness whereof, I have hereunto subscribed my name in the presence of two witnesses.

JACOB B. KNUDSEN.

Witnesses:
E. R. KING,
H. MONROE HUMASON.